Jan. 27, 1953  I. E. McCABE  2,627,013
CONTROL MEANS FOR ELECTRICAL DISTRIBUTION
Filed Feb. 17, 1950  2 SHEETS—SHEET 1

INVENTOR.
IRA E. McCABE
BY

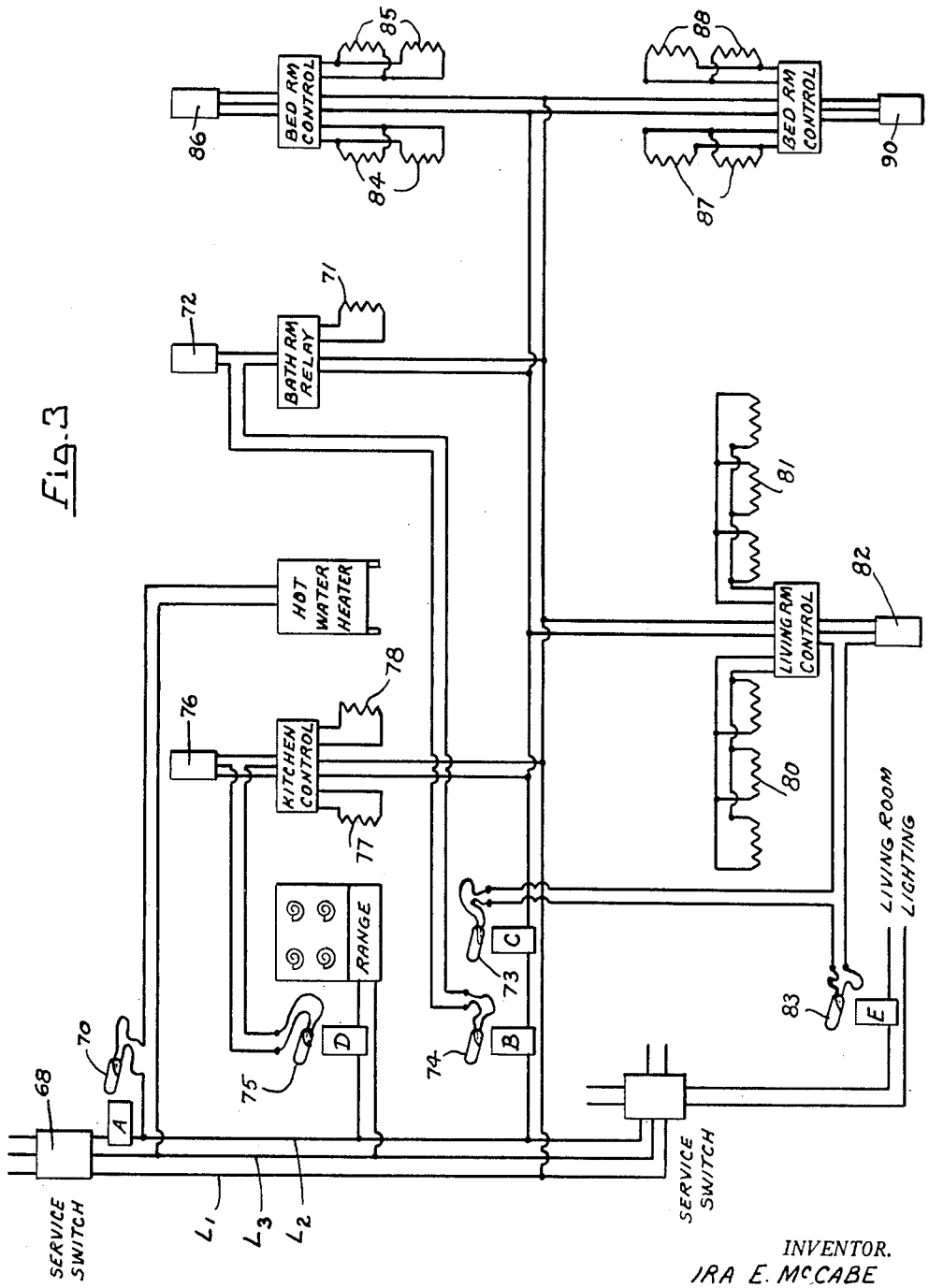

Patented Jan. 27, 1953

2,627,013

UNITED STATES PATENT OFFICE 2,627,013

CONTROL MEANS FOR ELECTRICAL DISTRIBUTION

Ira E. McCabe, Chicago, Ill.

Application February 17, 1950, Serial No. 144,828

17 Claims. (Cl. 219—20)

The invention relates to an improved system and apparatus for controlling the distribution of electrical energy and particularly the distribution of a limited available amount of electrical energy to various home utility devices including electric heating elements.

During the past years the demand by industrial and domestic users for electric power has progressively increased, necessitating constant improvements, modification and expansion of the facilities of the power companies. Because of the magnitude of these projects and the excessive costs incidental thereto the progress of the power companies in making available additional equipment for additional power has not always kept abreast with the demands of the times. It is readily understandable, however, that in supplying electrical energy a constant maximum demand is generally limited to short periods of time. Thus power plant investment and facilities, while anticipating growth in the power demand, do not fully meet all projected anticipations of such demands into the future, for the investment required to provide facilities supplying ultimate maximum demand would be prohibitive as against the return that can be secured for the service uses and maintenance of the facilities for normal, and less than the maximum demands over a long period of time.

Accordingly, it develops that uses for electrical power tend to exceed the available supply of the power facilities adjacent the site of the use. This is particularly manifest in the ever increasing use of electrical energy for electric household utilities, and of late years, the use of electric ranges and hot water heaters has presented a problem with respect to control of power distribution in order to render such devices useable with the power made available by the power companies.

Various control methods and devices have been introduced for controlling limited power supplies and for allocating the same on the basis of priority use for certain utilities in the household electric circuits, whereby said household utilities are made serviceable and useful within the limits of the power company to supply power and further, the cost of additional facilities and wiring to accommodate the load are minimized.

While the problem to some degree has been solved, it is a matter of new attention and concern today as regards the use of electric energy for house heating such as exemplified in the various forms of electric radiant heating that have been recently developed and placed on the market. Not only are the power companies limited as regards their present and future facilities in the supplying of great demands of power for electric radiant heating, but the limitations of presently wired houses to carry the load, the cost of re-wiring, or the cost of wiring new homes for heavy loads, and the cost of electric energy based on maximum demands when relatively small needs are normally required, all add up as prohibitive barriers to any extensive use of electric radiant heating. All of these factors contribute toward a new approach and consideration of the problem involving a need for a maximum demand for power, say in excess of a limited available supply, and of the customer's satisfaction, whereby the available power would be utilized in a manner to render the power demanding devices useful for the purposes intended including the new electric radiant heating systems, whereby their use may meet with the approval of the power companies and result in a cost economically attractive to the consumer.

It is to this problem relating to the effect upon power demands brought about by the use of electric radiant heating that this invention is directed. It is therefore an object of the invention to improve the method of control over the distribution of a limited available amount of electrical energy to various household utilities, and particularly with respect to the control of electrical energy to a plurality of electric heating elements comprising the source of heat for the dwelling.

Another object of the present invention is to provide control means for an electrical heating system which will render available the entire heating system for heating purposes with a minimum consumption of power as contrasted with the maximum power which the system might otherwise demand, and to further reduce the maximum demand for electric power when the system is under full load.

More specifically, another object of the invention is to provide a two-stage temperature control of an electric heating system whereby upon an initial demand for heat the heating elements are divided into two groups, and which are alternately energized to satisfy the initial heat demand. It is contemplated that the alternate energization of the heating elements will be of such duration that with respect to the various forms of electric radiant heating systems to which this invention is applicable, heat will continue to be radiated from one group of heating elements after de-energization and during the energization of the second group of heating elements, whereby the maximum heating effect is secured with a minimum of electrical energy. When such initial heating fails to meet the heat demands and the temperature recedes to a lower level, another stage of control is brought into play to effect continuous energization of both groups of heating elements. Since the elements are still in a partially heated condition when continuous energization is effected, a lower power demand results than would be the case if they were so energized when cold. Upon satisfying this additional demand for heat, alternate energization of the elements is again resumed and the same continues until the desired temperature is reached, with continuous heat, however, being introduced whenever the temperature recedes to the lower level during the heating period.

It is a further object of the present invention to integrate the electric heating circuit and the control devices therefor with the other household electric circuits together with load limiting devices, whereby the maximum available electric power commensurate with the wiring capacity of the dwelling, and as limited by the power company, may be utilized to render the entire electrical system productive of the most desirable and satisfactory results expected of the electrical devices and apparatus connected thereto.

Through the use of this invention excessive demands upon the power company are reduced and the attendant savings may be reflected in lower rates to the consumer. Furthermore, through this improved method of distributing power, consumer's demands are maintained at a higher level within the limits of the available power so that the power company load is levelled off and the productive capacity of its facilities are used to a higher degree throughout the entire day. The invention also reduces the copper requirements for distributing and handling the power load, making electric radiant heating available in homes and buildings as previously wired in addition to reducing the cost of new home construction. This particular method of control over the heating system also reduces the maximum demand of that portion of the whole electrical system in obtaining the maximum heating effect therefrom.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 3 is a wiring diagram illustrating a commercial application of the cycling relay unit of Figure 1 and which integrates a household electrical distribution system into one controlled within a limited supply of electrical energy.

Figure 1:
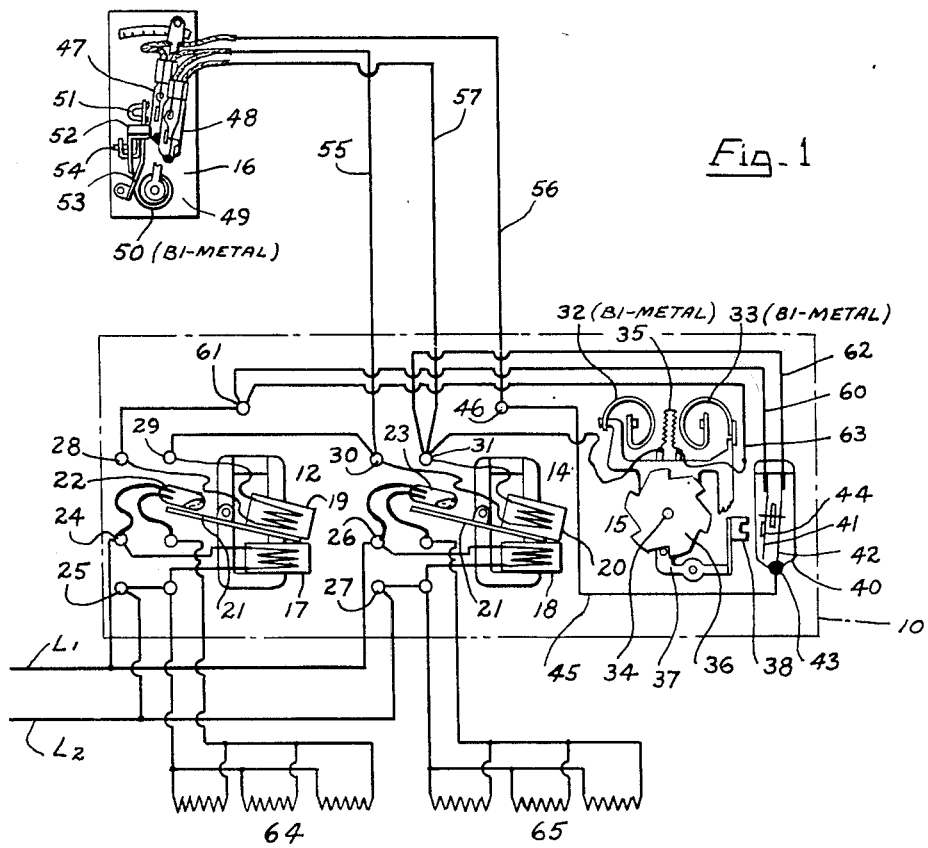
Figure 1 is a schematic diagram illustrating a cycling relay unit for controlling a plurality of electric radiant heating elements and wherein a two-stage temperature thermostat is employed for controlling the relay unit in accordance with the heat demands of the space being heated.

Referring to the drawings, particularly Figure 1, which illustrates an embodiment of the invention, the cycling relay unit or control device 10 essentially consists of relays 12 and 14 and time switch mechanism 15 of the type incorporating a heat motor. The cycling relay unit is electrically connected to a two-stage thermostat 16 for controlling the functions of the cycling relay unit in accordance with the heat demands of the space to be heated.

Figure 2:
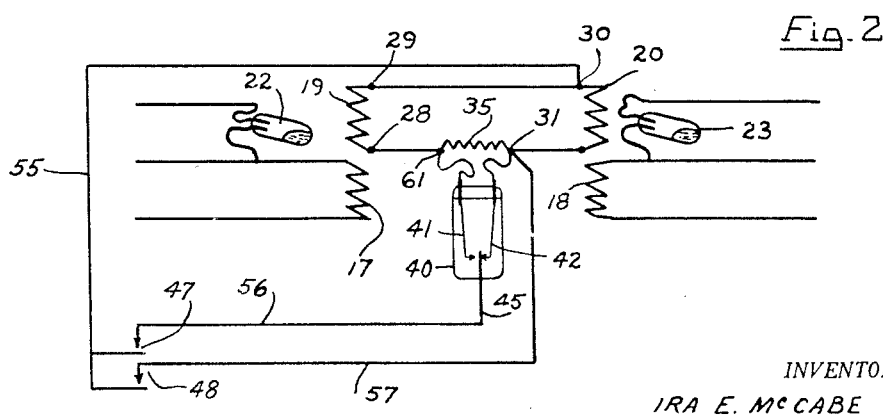
Figure 2 illustrates in schematic form the wiring circuits for the several elements making up the combination shown in Figure 1.

The relays 12 and 14 are of the transformer repulsion type each having a fixed primary coil 17 and 18, respectively, and a movable secondary coil 19 and 20, respectively. The transformer is self-contained in the relay and when line current is supplied to the primary coil it induces a low voltage current in the secondary coil. Each movable secondary coil is secured to a tilting bracket 21 pivoted to the core of the transformer and each bracket carries at the end opposite the coil a mercury switch designated 22 for relays 12 and 23 for relay 14. When the primary coil is energized and the low voltage secondary winding of the same is closed by a thermostat or other control connected to the terminals thereof magnetic repulsion elevates the secondary coil, thereby tilting the mercury switch to close a circuit electrically connecting therewith. The primary coils 17 and 18 are supplied with electric current obtained from the alternating current supply line $L_1$—$L_2$. The leads of the primary winding 17 connect with the terminals 24 and 25 which are suitably joined by conductors to lines $L_1$—$L_2$. The alternating current supply is also connected to terminals 26 and 27 whereby the supply $L_1$—$L_2$ electrically connect with the leads of the primary winding 18 so that the primary coils of the relays are continuously supplied with current. Secondary 19 is electrically connected to terminals 28 and 29 and in a similar manner the secondary 20 is connected to terminals 30 and 31. As shown in Figure 2, a heat motor is included in the circuit of the secondary coils and said heat motor will now be described in detail.

For a full and complete understanding of the heat motor reference is made to my Patent No. 2,270,961, dated January 27, 1942 and entitled Electrically Actuated Heat Motor. It is sufficient for an understanding of this invention to explain that the motor essentially consists of a pair of bi-metallic elements 32 and 33 and which are heated to impart movement to operating mechanism (not shown) resulting in the rotation of a motor shaft 34. An electric heating unit 35 is arranged for operation with the bi-metallic elements 32 and 33 and the action of said unit is to cause alternate heating of said elements.

Assuming that the heating unit 35 is located adjacent the bi-metallic element 33, the heating of this element will expand, the same producing actuation of a member which will effect oscillation of the unit 35 to locate the same adjacent bi-metallic element 32. This oscillation produces rotation of the motor shaft and it will be understood that heating and cooling of the bi-metallic elements takes place alternately to effect shaft rotation through the member and associated operating instrumentalities which are disclosed in detail in the patent herein referred to. A multi-pointed cam 36 is secured to the shaft for rotation therewith and associated with said cam for operation thereby is a rocking lever 37. Said lever is caused to follow the irregular surface of the cam and the magnet 38 is accordingly oscillated at periodic intervals toward and away from the magnetically actuated switch 40. Said mercury switch is the enclosed two-electrode type and includes the electrodes 41 and 42 which are spring mounted and connected so as to result in joint movement in the opening and closing of their respective circuits. In the normal position the electrode 41 has contact with the mercury pool 43, constituting a common terminal for both said electrodes, and 42 is disengaged from the mercury pool. When the magnet 38 is located close to the switch the armature 44 carried by electrode 41 is attracted to change the contact positions of the same and accordingly 41 is disengaged from the mercury pool and 42 is caused to engage. Upon removal of the magnetic force the spring structure of the switch returns the contacts to their normal position. The conductor 45 electrically connects the mercury pool with terminal 46.

The two-stage room thermostat generally indicated by numeral 16 is of the type disclosed in my Patent 2,233,674 granted March 4, 1941 and entitled Temperature Controlling System. The thermostat essentially consists of a pair of magnetically actuated enclosed mercury switches, the numeral 47 indicating the rear switch and numeral 48 the front switch, and which are suitably mounted on a base member or support 49 in combination with a thermostatic coil 50 responsive to temperature changes. Each mercury switch has associated therewith a magnet, the magnet 51 being located adjacent switch 47 for actuating an electrode of said switch and magnet 52 being located adjacent switch 48 for actuating an electrode of the same. The magnet 52 is mounted on the free outer end of the bi-metallic element 50 and as said element responds to temperature changes the magnet will be moved toward or away from its switch. The magnet 51 is carried upon the upper end of a pivoted arm 53, which arm provides an adjustable member 54 adapted for engagement with the supporting structure of magnet 52 whereby movement of said magnet 52 by the thermostatic element 50 upon a temperature rise may be followed by movement of magnet 51 to effect a two-stage operation of the thermostat 16.

The conductor 55 connecting with terminal 30 constitutes the common conductor for the switches 47 and 48 of the thermostat and it will be understood that an electrode in each switch is electrically connected to said conductor. The other electrode of switch 47, constituting the high temperature switch, is electrically connected to conductor 56 which in turn connects with terminal 46. The low temperature switch 48 has its other electrode connected to conductor 57 which leads from terminal 31.

Assuming that both switches 47 and 48 are in open circuit position, then a drop in temperature of approximately one degree Fahrenheit below the control setting will actuate the thermostatic element 50 to effect movement of magnet 51, locating the same adjacent switch 47 and causing the circuit controlled by said switch to close. Should the temperature decline approximately another one degree Fahrenheit the magnet 52 will be actuated, locating the same adjacent switch 48 and the electrodes of this switch will close to close the circuit controlled thereby. Upon a rise in temperature, switch 48 is first opened and thereafter upon a continued rise in temperature the switch 47 is opened.

The secondary windings 19 and 20 of the relays, are connected in series with each other and with the heating element 35 as best shown in Figure 2. Conductor 60 leads from terminal 61 and connects electrode 41 of the alternating switch 40. Terminal 31 is connected by the conductor 62 with electrode 42 of said switch and conductor 63 connects one lead of the heat motor to terminal 61, the other lead of said motor being connected to terminal 31. As a result of said circuit connections the heating unit 35 is in series with the secondaries 19 and 20 and it will be further observed that the heating unit 35 is connected across the two electrodes of switch 40.

The radiant heating elements consist of a plurality of resistance elements which, for purposes of this invention, have been divided into two groups. Accordingly, said elements are designated by numerals 64 and 65 and although three members are shown as constituting each element, this is not to be considered as limiting the invention since any number of members may be employed in parallel circuit relation to form one of said radiant heating groups. The resistance element 64 is connected in series with the switch 22 and the circuit including the switch and the element is connected across the alternating power supply lines $L_1$—$L_2$ so that when the switch 22 is closed current is supplied to energize the radiant heating element 64. In a similar manner the resistance element 65 connected in series with switch 23 and the circuit is connected across the alternating power supply lines $L_1$—$L_2$ so that when switch 23 is closed current is supplied to the radiant heating element 65 to energize the same.

When the room thermostat 16 has effected an opening of the switches 47 and 48, due to an adequate supply of heat to the room, the relay cycling unit is inoperative, the heating unit 35 is de-energized and both switches 22 and 23 are in open position so that resistance elements 64 and 65 are likewise de-energized. The secondary windings 19 and 20 are in series and are polarized to prevent current flow so that neither secondary is repelled and the heat motor remains de-energized. Switch 47 of the room thermostat 16 is the high switch since it is the first to close upon a drop in temperature. When closing of this switch takes place a parallel hookup of the two secondaries is established through the heat motor switch. As shown in Figure 2, the heat motor switch has its right hand electrode 42 connecting with conductor 45 and as a result the current induced in the secondary 20 is caused to flow through said winding, through conductors 45 and 56, switch 47, the common conductor 55 and back to the other lead of secondary 20. Current flow through secondary 20 will be sufficient to effect repulsion of the same by its continuously energized primary 18 with the result that the relay switch 23 is closed and the resistance element 65 is energized. Current also flows through the secondary 19, being likewise induced therein as a result of its continuously energized primary 17. However, the heating unit 35 is in series with this secondary when electrode 42 is closed so that current flow is sufficiently limited to prevent repulsion of the secondary 19 and relay switch 22 remains open. After a predetermined interval of time, depending on the setting of the heat motor, cam actuated lever 37 will be actuated, causing a change in the contact position of switch 40 whereby electrode 42 is caused to open and electrode 41 is caused to close. This has the effect of switching heating unit 35 from secondary 19 to secondary 20 and accordingly current flows in an uninterrupted manner through secondary 19 such that the same is repulsed by its primary winding 17 and switch 22 is closed to effect energization of resistance element 64. Since secondary 20 now has heating unit 35 in series relation therewith, current flow through the secondary is sufficiently reduced to prevent repulsion of the secondary and its switch 23 opens to de-energize element 65. In other words, by alternately introducing the heating unit into series circuit relation with secondaries 19 and 20 the relay switch 22 and switch 23 are alternately closed and the radiant heating elements are alternately energized. This operation takes place as long as the high switch of the thermostat remains closed. Should the heating produced by the alternate energization of the two groups of heating elements satisfy the demand for heat the said high switch will eventually open and the relay cycling unit will become inoperative. However, should alternate energization of the two groups of radiant heating elements fail to satisfy the requirements for heat, the low temperature switch 48 will close to establish a circuit around the heating unit 35 and as a result maximum flow of the induced current in each secondary takes place to effect repulsion of the secondaries and energization of both radiant heating elements. Operation of the heat motor upon closing of low switch 48 will now be described.

When switch 48 closes a circuit is established by conductor 57 which in effect shunts the heating unit 35 and connects directly with the secondary 20. With the heat motor switch in position as shown in Figure 2, the heating unit 35 will continue to be energized from the secondary 19 and this prevents the closing of relay switch 22. However, as soon as the switch is actuated to shift its electrodes, bringing 41 into contact with conductor 45, the heating unit 35 is shunted out of the circuit and both secondaries are repulsed to close their respective relay switches. It will be observed that at this stage of operation secondary 19 remains continuously energized through electrode 41 of the switch 40 and secondary 20 remains continuously energized through the circuit including conductor 57 and switch 48. Continuous energization of both groups of radiant heating elements is the result of switch 48 closing and the same continues until a predetermined heating is secured.

As the room temperature rises with the increased heating that results from continuous energization of the elements the thermostat 16 will presently open switch 48 and operation again takes place through the heat motor to produce alternate energization of the relays and of the resistance elements. Complete deenergization results from a further increase in room temperature, causing opening of switch 47.

As disclosed in the illustrated embodiment of this invention a combination of circuit controlling instrumentalities is electrically connected and cooperatively arranged to effect alternate energization of two groups of electric heating elements and which shifts from alternate to continuous energization of said groups in the event the space to be heated calls for more heat than is provided by the alternate energization. When the room is heated to a predetermined temperature through continuous energization of the heating elements, alternate energization is again restored and finally when the desired maximum temperature is reached complete de-energization takes place. The present invention, although having general use in the field of electric radiant heating, is particularly adaptable for use with radiant heating elements that draw considerably more current when initially energized in the cold state than they do if partially heated when initially energized.

The advantages of the present form of control reside in reducing the maximum current demands of a plurality electric radiant heaters by initiating their energization in groups. Since the elements as mentioned draw considerably more current upon initial energization when cold than they do after they have been operating for a time and have become hot, it follows that the maximum demand of a plurality of heaters can be materially reduced by cutting in one group, and after they have become hot and are drawing less current, to then cut in the other group. Accordingly, the invention contemplates cycling periods of alternate energization and which will not permit a group to cool completely before re-energization. For example, with a pair of cold elements such as are included in the group designations 64 and 65, having a starting load of 1300 watts each, their respective load demands after a period of energization fall to 900 watts each. With alternate energization of the elements as provided for by this invention and when an element load demand has reached say 1000 watts, the re-energization of a previously de-energized element, while it is still warm, results in said element having a load demand of only 1100 watts. Thus throughout a preiod of alternate energization the initial load demand for each element is reduced from 1300 watts to 1100 watts and upon continuous energization of both elements the maximum initial load demand is reduced from 2600 watts to a value between 2300 and 2100 watts. Another important feature of the invention in regard to alternate energization of the elements is the fact that heat is obtained not only from the energized element but also from the element previously energized since it continues to radiate heat for some time after de-energization. By properly selecting the cycling periods it is possible to obtain the maximum heating effect with the minimum of expendable energy to satisfy the overall heating requirements of a dwelling.

It is recognized that other forms of relays, time actuated switches and two-stage thermostats, in addition to those illustrated, may be used and arranged for operation in the manner as taught by this invention to produce the results accruing therefrom. By using the type of relays and timing mechanism disclosed a simple and quiet operating unit is produced and one which is entirely satisfactory and has operation automatically to control groups of radiant heating elements in the manner as described.

In the use of radiant heating for dwellings each room is provided with individual thermostatic control of one or more heating elements. Since many homes employing this type of heating would most likely have an electric range and an electric hot water heater as well as other household electric utilities, the additional load represented by the heating system presents a serious problem for the electric company in distributing a limited available amount of electrical energy.

Whereas, the relay cycling unit of the invention constitutes means for controlling the heating to effect a reduced load demand, and whereas, load limiting devices have been and are in use to control electric household circuits within the limits of the power available, nevertheless further consideration of the control problem is rendered essential when the entire picture includes an electric heating system which in itself may represent a potential power demand approximately equal to the entire power otherwise needed for the other electric service devices and equipment.

Figure 3 represents a commercial application of the relay cycling control unit in a household electrical system wherein the same integrates the control of the various circuits for utilizing a limited supply of electrical energy. The alternating current supply to the house or dwelling is indicated by $L_1$, $L_2$ and $L_3$, the same constituting three-phase current and which is initially delivered to the service switch 68. Assuming the available power is in the vicinity of fifty per cent of the potential maximum demand calculated for the whole system, a load limiter A of commercial form including a switch 70 is interposed in the supply system as it leaves the service switch and in advance of all the house circuits. The load limiter is adapted to operate the switch 70, which is located in the electric hot water heater circuit, whenever the system load reaches the value set as the maximum available for the particular dwelling. Since it is possible to secure hot water heaters with ample storage capacities they may be operated at times when the demands are low and still provide a satisfactory supply of the desired hot water.

The household lighting circuit, also serving as the energizing circuit for many of the electric appliances, and the electric range may be considered as two load circuits for which unrestricted power should be available. These two priority circuits may constitute a maximum load demand amounting to one-half the available supply, leaving a like amount of electric power for the heating system. However, it is possible for the heating system to have a maximum total peak load demand amounting to as much as twice the power available for it. To limit the supply of power to the heating circuit a commercial form of load limiter C is interposed in the supply circuit to the heating system. The switch 73 is associated with the load limiter C.

The first step in controlling distribution of electric power to the heating system as disclosed in Figure 3 consists in providing the several rooms with a cycling relay unit as shown in Figures 1 and 2. The disposition of the cycling relay units as shown in combination with the load limiters, which have been selectively placed in various circuits, will permit operation of all the heating units in the dwelling without exceeding the limits for which the limiter C is set. This occurs only with alternate energization of the heating elements with the exception of the single element 71 located in the bathroom and which is controlled by a single-stage thermostat 72. The thermostat 72 operates through a single relay unit such as 12, Figure 1, and provides either continuous energization of the element 71 or no energization at all.

In the event all the heating units are in operation the need for bathroom heating may not be considered essential since areas adjacent to it are being heated and, furthermore, the electric power thus saved can be used elsewhere. In fact, the power saved by not heating the bathroom may be used in some other area without operating load limiter C even though continuous energization of the radiant heaters takes place. In accordance with the invention, therefore, a second load limiter B is interposed in the supply line to the heating system and the same is set for operation at a value below that set for limiter C. The load limiter B has associated therewith switch 74 and when the load demand is such as to actuate the limiter B, switch 74 is opened to bring about an interruption in the thermostatic control circuit for the bathroom heater. When the load demand falls to a value below the setting for load limiter B, switch 74 will close and the bathroom heater will be again energized under the control of its thermostat. On the other hand, with bathroom heating cut off alternate heating in some space may not be sufficient to satisfy the demand for heat therein and the second stage, that of continuous energization of the heaters accordingly takes place. With the system illustrated and bathroom heating cut off, continuous energization of the heaters in the living room and one bed room, or the heaters in both bed rooms, is possible with alternate cycling elsewhere without effecting operation of the limiter C.

To further permit the greatest possible heating to take place without exceeding the limits set by limiter C, the temporary termination of bathroom heating is supplemented by a termination of kitchen heating. By placing a load limiter D of commercial form in the electric supply line to the electric range and locating a switch 75 in the circuit of the thermostat 76 it is possible to discontinue energization of the kitchen heaters 77 and 78 when the load demand of the electric range reaches a predetermined maximum as determined by the setting for the load limiter D. As shown, the switch 75, is interposed in the common conductor of the thermostat, thus discontinuing all energization of the heat elements 77 and 78 when the switch 75 is open. However, it is possible, and it may sometimes be desirable, to locate switch 75 in that circuit to the thermostat 76 which would eliminate only continuous energization of the heaters, permitting alternate energization to take place when switch 75 is opened. Thus with heat being supplied to the kitchen by operation of the electric range, a cutout may be effected of the kitchen heaters, rendering the power thus saved available for use elsewhere.

With the kitchen area activities having the effect of creating low heat demands and bed room temperature requirements likewise generally low, the larger rooms of the dwelling, such as the living room, may be provided with the greatest amount of potential heating. As shown in Figure 3, the living room has three members constituting each radiant heating element generally indicated by numerals 80 and 81, with the elements being controlled by thermostat 82. Should areas other than the living room demand more heat such as would bring about continuous energization of all the heating elements to create a load effecting operation of limiter C, the necessary restrictions to be imposed upon the system may be most advantageously directed to the living room where the greatest number of heaters are located. For example, the rooms farthest removed from the living room may be affected by climatic conditions different from those affecting the living room, and accordingly said rooms would call for maximum heat so that heating of the living room could be curtailed with sufficient heat still being supplied thereto to satisfy the needs therein under existing conditions. Thus, by interposing the switch 73 of the limiter C in the circuit controlling continuous energization of the living room heaters 80 and 81, it is possible only to alternately energize the heaters, continuous energization being impossible, when the heating load demand reaches the value producing operation of limiter C. With the living room placed on an alternate cycle of heating it will be understood that continuous energization of all the other heaters except the bathroom may be possible without demanding more power than is allocated to the heating circuit. The load limiters B and C as employed in the heating system of Figure 3 would operate in such a manner that having opened their respective switches a decrease in load value would have to take place greater than the value of the load removed from service before either of them would restore their switches to closed position.

In accordance with the invention a load limiter E is installed in the service supply line for the living room lighting circuit. The switch 83 is interposed in the continuous circuit of the thermostat 82 and in series relation with switch 73 of load limiter C. The load limiter E is arranged to cause opening of switch 83 whenever the load on the lighting circuit reaches a value approximately equal to one-half the load of the living room heaters, and when said switch 83 opens its circuit to thermostat 82 the heaters 80 and 81 are permitted to operate only on an alternate heating basis. It will be understood that the load demand devices in the living room lighting circuit constitute electric lamps, radios and other heat generating appliances.

As explained by the foregoing the system of electrical distribution as shown in Figure 3 is primarily adapted for household electric circuits that are limited to a supply of electrical energy below their maximum requirements. The system essentially consists of fixed priority circuits without load restrictions and secondary circuits including an electric heating circuit limited in load value by the priority load values so that the combined total load demand is not in excess of the available supply. The system also includes a plurality of temperature control means for groups of electric heaters adapted to individually establish a cycle of alternate energization of said groups to satisfy one level of temperature control and to establish continuous energization of said groups of heaters to satisfy a second level of temperature control. Load limiting devices are located in the priority circuits for limiting the operation of the secondary circuits, and also the operation of selected heaters included in the secondary circuits to selected levels of temperature control, when the current load in the priority circuits reaches predetermined values. Also in accordance with the invention additional load limiting devices are interposed in the heating circuits and these devices are adapted to limit the heating of certain rooms to selected or certain levels of temperature control during intermediate and maximum stages of power demands on the heating circuit.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In control means, the combination with a plurality of resistance elements for radiant heating, of a relay switch for each element connected in series circuit relation therewith for controlling current flow to the element, a relay for each switch for actuating the same into a closed circuit position when its relay is energized, timing means providing a cycling switch for alternately energizing the relays and thus the resistance elements, thermostatic means including a high temperature switch and a low temperature switch, and circuit means electrically connecting the high and low temperature switches and the cycling switch with the relays, said thermostatic means having two-stage operation through its high and low temperature switches for selectively energizing the relays either alternately through the cycling switch or continuously by rendering the cycling switch non-operative as regards its cycling function.

2. In control means, the combination with a plurality of resistance elements for radiant heating, of a relay switch for each element connected in series circuit relation therewith for controlling current flow to the element and energization of the same, a relay for each switch normally maintaining the same in open circuit position but actuating the switch into a closed circuit position upon energization of the relay, cycling switch means for alternately energizing the relays and thus the resistance elements, thermostatic means including a high temperature switch and a low temperature switch, and circuit means electrically connecting the high and low temperature switches and the cycling switch means with the relays in a manner whereby the high temperature switch controls the alternate energization of the relays through the cycling switch means and the low temperature switch controls the continuous energization of the relays by rendering the cycling switch means non-operative.

3. In control means, the combination with a plurality of resistance elements for radiant heating, of a relay switch for each element connected in series circuit relation therewith for controlling current flow to the element and energization of the same, a relay for each switch normally maintaining the same in open circuit position but actuating the switch into a closed circuit position upon energization of the relay, timing means providing switch structure electrically connected in circuit with the relays and operative to energize the relays and thus the resistance elements in an alternate manner, and thermostatic means providing dual temperature control of the energization of the relays, said thermostatic means having circuit connections with the switch structure of the timing means and controlling said switch structure at one temperature level to effect alternate energization of the relays and effecting continuous energization of the relays at the second temperature level by establishing a circuit around the switch structure and which renders the switch structure non-operative as regards its alternating function.

4. In an electrical distribution system for a dwelling, the combination with a power supply line for delivering electrical energy, of an electrical heating circuit for a plurality of rooms in the dwelling, certain of said rooms having a pair of resistance elements for radiant heating, a cycling relay unit for each room interposed in the electrical heating circuit and operative at one temperature level to energize the resistance elements of the room in an alternate manner and operative at a lower temperature level to effect continuous energization of the resistance elements, a load limiter in the electrical heating circuit having a maximum load setting such as will permit simultaneous energization of the resistance elements in all the rooms on an alternating basis, a switch controlled by said load limiter and actuated into open position upon operation of the load limiter, said switch controlling the cycling relay unit in one of said rooms and preventing continuous energization of the resistance elements in said room when the switch is open.

5. In an electrical distribution system for a dwelling as defined by claim 4, additionally including a single resistance element connected to the electrical heating circuit for radiant heating one of said rooms, a second load limiter in said heating circuit in advance of the first mentioned load limiter and having a maximum load setting below that of the first mentioned load limiter, and a second switch controlled by said second load limiter and actuated into open position upon operation of the second load limiter, said second switch controlling energization of the single resistance element and which is thereby disconnected from the heating circuit before actuation of the first mentioned load limiter.

6. In an electrical distribution system for a dwelling, the combination with a power supply line for delivering electrical energy, of a plurality of priority circuits without load restrictions including an electric heating circuit receiving electrical energy from said line, a plurality of secondary circuits having parallel connection with the priority heating circuit, certain of said secondary circuits each connecting with a pair of resistance elements for radiant heating, a relay cycling unit in electrical association with each pair of radiant heating elements, thermostatic means for each cycling unit capable of dual control for effecting through the cycling unit alternate energization of its resistance elements for one temperature level of control or continuous energization of its resistance elements for another temperature level of control, and load limiting means in the priority circuits responsive to load demands of said priority circuits for regulating the relay cycling units respectively, and capable of rendering the units inoperative, or partially operative for effecting alternate energization only, or fully operative for selectively effecting both alternate and continuous energization of the resistance elements.

7. In an electrical distribution system for a dwelling, the combination with a power supply line for delivering electrical energy, of a plurality of priority circuits having predetermined peak load demands for said energy, a plurality of secondary circuits limited to a supply of electrical energy by the peak load demands of the priority circuits such that the combined peak loads of priority and secondary circuits do not exceed a predetermined available supply of said energy, said secondary circuits including a plurality of electric heaters arranged throughout the dwelling electrically connected to comprise a heating circuit for heating the various rooms thereof, individual thermostatic room control of the heaters therein, said thermostatic control for a room with a plurality of heaters being of such character that said heaters are de-energized in satisfying a first stage temperature requirement of said control, alternately energized in groups to satisfy a second stage temperature requirement of said control, and continuously energized as a unit to satisfy a third stage temperature requirement of said control, a plurality of load limiters in the priority circuits adapted to limit the operation of selected electric heaters to selected stages of thermostatic room control when load values in selected priority circuits attain a predetermined value, and additional load limiting devices in the heating circuit adapted to limit the operation of selected electric heaters to selected stages of thermostatic room control for the purpose of limiting the maximum load demands for said heating circuit to the available supply of electrical energy for said circuit.

8. An electrical distribution system for a dwelling as defined by claim 7, additionally including a load limiting device responsive to the combined load demands of priority and secondary heating circuits adapted to limit the energization of another secondary circuit to certain time periods when the combined priority and heating loads are below a predetermined value.

9. In control means, the combination of a plurality of resistance elements for radiant heating, of a pair of electric circuits each circuit including at least one of said elements, an electric switch for each circuit for controlling energization of the elements of its circuit, a pair of transformer relays for actuating said switches, respectively, each said relay comprising relatively movable primary and secondary coils and which repel each other to actuate their switch upon energization of the relay provided an induced current of a predetermined value flows through the secondary coil thereof, circuits for each of the secondary coils of the relays connected in series relation and polarized to prevent the flow of induced currents through the coils, a resistance element electrically connected in the secondary series circuit and operative to prevent repulsion of the coils of one relay by limiting current flow through the secondary coil thereof to below said predetermined value upon short circuiting of the other secondary coil to energize the other relay, secondary circuit control means comprising a switch having a pair of contacts adapted to be alternately closed and opened, and a circuit connecting each switch contact with the secondary series circuit to effect a short circuiting of the secondary coils, respectively, as the switch contacts are alternately closed whereby to alternately energize the relays and thus the respective heating elements controlled thereby.

10. Control means of the character defined by claim 9, additionally including a thermostat having connection with the secondary control circuit switch for controlling the circuits established by said switch in short circuiting the secondary coils.

11. Control means of the character defined by claim 9, additionally including a thermostat having connection with the secondary circuit control switch, said thermostat having one level of temperature control for controlling the circuits established by said switch in short circuiting the said secondary coils, and said thermostat having a second level of temperature control whereby one secondary coil is directly short circuited by by-passing the said control switch so that both relays are energized simultaneously when the other secondary coil is short circuited through actuation of the control switch.

12. In control means, the combination of a plurality of resistance elements for radiant heating, of a pair of electric circuits, each circuit electrically including such elements in approximately equal numbers, an electric switch for each circuit for controlling energization of the elements of its circuit, a pair of transformer relays for actuating said switches respectively, each said relay comprising relatively movable primary and secondary coils and which repel each other to actuate their switch upon energization of the relay provided an induced current of predetermined value flows through the secondary coil thereof, circuits for each of the secondary coils of the relays connected in series relation and polarized to prevent the flow of induced currents through the coils, secondary circuit control means comprising a switch having a pair of contacts adapted to be alternately closed and opened, means including heat actuated mechanism for actuating said contacts, said heat actuated mechanism including a resistance element in the secondary series circuit and operative to prevent repulsion of the coils of one relay by limiting current flow through the secondary coil thereof to below said predetermined value upon short circuiting of the other secondary coil to energize the other relay, and a circuit connecting each switch contact with the closed secondary circuit on respective sides of the resistance element to effect a short circuiting of the secondary coils, respectively, as the switch contacts are alternately closed, whereby to alternately energize the relays and thus the respective heating elements controlled thereby.

13. Control means of the character defined by claim 12, additionally including a thermostat having connection with the secondary circuit control switch for controlling the circuits established by said switch in short circuiting said secondary coils.

14. Control means of the character defined by claim 12, additionally including a thermostat having connection with the secondary circuit control switch, said thermostat having one level of temperature control for controlling the circuits established by said switch in short circuiting said secondary coils, and said thermostat having a second level of temperature control whereby one secondary coil is directly short circuited by by-passing said control switch so that both relays are energized simultaneously when the other secondary coil is short circuited through actuation of the control switch.

15. In control means, the combination with a plurality of resistance elements for radiant heating, of electric switch means for each element connected in series circuit relation therewith for controlling current flow to the element, relay means associated with each switch means and normally maintaining the same in open circuit relation but actuating the switch means into closed circuit position for each energization of the relay means, timing means providing a cycling switch, said cycling switch being effective when operative to energize the relays in an alternate manner whereby the resistance elements are alternately energized, and thermostatic means for controlling the energization of the relays, said thermostatic means having operation at two temperature levels in the event of a rise or a fall in the temperature, one temperature level of operation controlling the alternate energization of the relays through operation of the cycling switch, and the second temperature level of operation controlling the continuous energization of the relays by rendering the cycling switch nonoperative as regards its cycling function.

16. In control means, the combination with a pair of resistance elements for radiant heating, of a cycling relay unit including a switch for each element for controlling current flow to the element and energization of the same, an inductive winding providing a relay for each switch for actuating the switch into a closed circuit position upon energization of the winding, a cycling switch connected to the inductive windings in a manner whereby the cycling switch when operative effects alternate energization of the windings, timing means comprising a resistance heating unit for controlling operation of the cycling switch, a circuit for each of said windings having connection with each other and with said cycling switch, said connections being so arranged and being so controlled by the cycling switch that when one winding is energized the resistance heating unit is series connected in the circuit of the other winding to thus limit current flow therethrough and prevent operative energization of said other winding, and thermostatic means including a temperature responsive switch adapted to close below a predetermined temperature to thereby close a circuit to said cycling switch permitting current to flow through the cycling switch to energize the resistance heating unit, whereby said cycling switch is caused to operate for the alternate energization of the inductive windings.

17. In control means, the combination with a pair of resistance elements for radiant heating, of a cycling relay unit including a switch for each element for controlling current flow to the element and energization of the same, an inductive winding providing a relay for each switch for actuating the switch into a closed circuit position upon energization of the winding, a cycling switch connected to the inductive windings in a manner whereby the cycling switch when operative effects alternate energization of the windings, timing means comprising a resistance heating unit for controlling operation of the cycling switch, a circuit for each of said windings having connection with each other and with the cycling switch, said connections being so arranged and being so controlled that when one winding is energized the resistance heating unit is series connected in the circuit of the other winding to thus limit current flow therethrough and prevent operative energization of said other winding, thermostatic means including a high temperature switch and a low temperature switch adapted to close in response to different temperature levels, said high temperature switch upon closing establishing a circuit permitting current to flow through the cycling switch to energize the resistance heating unit, whereby said cycling switch is caused to operate for the alternate energization of the inductive windings, and said low temperature switch upon closing establishing a second circuit in shunt relation to the cycling switch and which directly effects energization of one of said inductive windings, whereby, when the cycling switch effects energization of the other winding with resultant deenergization of the resistance heating unit, both windings will be energized simultaneously and which will continue as long as the second circuit remains closed.

IRA E. McCABE.

REFERENCES CITED

The following references are of record in the file of this patent:

UNITED STATES PATENTS

| Number | Name | Date |
| --- | --- | --- |
| 1,014,049 | Cutler et al. | Jan. 9, 1912 |
| 1,511,050 | Collins et al. | Oct. 7, 1924 |
| 1,674,451 | Schrumm | June 19, 1928 |
| 2,064,654 | Gannon | Dec. 15, 1936 |
| 2,139,454 | McCabe | Dec. 6, 1938 |
| 2,199,639 | Lee et al. | May 7, 1940 |
| 2,233,674 | McCabe | Mar. 4, 1941 |
| 2,266,152 | Biebel | Dec. 16, 1941 |
| 2,270,961 | McCabe | June 27, 1942 |
| 2,387,562 | Brunot | Oct. 23, 1945 |
| 2,422,526 | Burch | June 17, 1947 |
| 2,557,905 | Burton et al. | June 19, 1951 |